US009524117B2

(12) United States Patent
Walker

(10) Patent No.: US 9,524,117 B2
(45) Date of Patent: *Dec. 20, 2016

(54) CONTROL OF PAGE ACCESS IN MEMORY

(71) Applicant: Micron Technology, Inc., Boise, ID (US)

(72) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/918,364

(22) Filed: Oct. 20, 2015

(65) Prior Publication Data

US 2016/0041785 A1 Feb. 11, 2016

Related U.S. Application Data

(60) Continuation of application No. 14/286,104, filed on May 23, 2014, now Pat. No. 9,176,904, which is a
(Continued)

(51) Int. Cl.
*G06F 12/00* (2006.01)
*G06F 3/06* (2006.01)
(Continued)

(52) U.S. Cl.
CPC .......... *G06F 3/0622* (2013.01); *G06F 3/061* (2013.01); *G06F 3/0604* (2013.01); *G06F 3/0644* (2013.01); *G06F 3/0688* (2013.01); *G06F 3/0689* (2013.01); *G06F 12/00* (2013.01); *G06F 12/0215* (2013.01); *G06F 12/06* (2013.01); *G06F 12/14* (2013.01); *G06F 13/00* (2013.01); *G06F 13/14* (2013.01); *G06F 13/16* (2013.01); *G06F 13/161* (2013.01); *G06F 13/1615* (2013.01); *G06F 13/1668* (2013.01); *G06F 13/4243* (2013.01); *G06F 15/7821* (2013.01); *Y02B 60/1207* (2013.01); *Y02B 60/1225* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS 6,076,139 A 6/2000 Welker et al.
6,408,371 B1 6/2002 Jeddeloh
(Continued)

*Primary Examiner* — Midys Rojas
(74) *Attorney, Agent, or Firm* — Fletcher Yoder, P.C.

(57) ABSTRACT

The present techniques provide systems and methods of controlling access to more than one open page in a memory component, such as a memory bank. Several components may request access to the memory banks. A controller can receive the requests and open or close the pages in the memory bank in response to the requests. In some embodiments, the controller assigns priority to some components requesting access, and assigns a specific page in a memory bank to the priority component. Further, additional available pages in the same memory bank may also be opened by other priority components, or by components with lower priorities. The controller may conserve power, or may increase the efficiency of processing transactions between components and the memory bank by closing pages after time outs, after transactions are complete, or in response to a number of requests received by masters.

19 Claims, 3 Drawing Sheets

Related U.S. Application Data continuation of application No. 13/750,560, filed on Jan. 25, 2013, now Pat. No. 8,738,837, which is a division of application No. 12/478,532, filed on Jun. 4, 2009, now Pat. No. 8,380,916.

(51) Int. Cl.

| | |
|---|---|
| *G06F 13/16* | (2006.01) |
| *G06F 13/14* | (2006.01) |
| *G06F 12/02* | (2006.01) |
| *G06F 12/14* | (2006.01) |
| *G06F 12/06* | (2006.01) |
| *G06F 13/00* | (2006.01) |
| *G06F 13/42* | (2006.01) |
| *G06F 15/78* | (2006.01) |

(56) References Cited

U.S. PATENT DOCUMENTS

| | | |
|---|---|---|
| 8,234,460 B2 | 7/2012 | Walker |
| 2002/0174292 A1 | 11/2002 | Morita et al. |
| 2003/0225959 A1 | 12/2003 | Roohparvar |
| 2005/0125620 A1 | 6/2005 | Parthasarathy et al. |
| 2006/0168407 A1 | 7/2006 | Stern |
| 2007/0169123 A1 | 7/2007 | Hopkins |
| 2007/0233943 A1 | 10/2007 | Teh et al. |
| 2007/0239955 A1 | 10/2007 | Teh et al. |
| 2008/0022048 A1 | 1/2008 | Baker |
| 2010/0312997 A1 | 12/2010 | Walker |
| 2010/0312998 A1 | 12/2010 | Walker |
| 2010/0312999 A1 | 12/2010 | Walker |
| 2010/0313000 A1 | 12/2010 | Walker |
| 2011/0093662 A1 | 4/2011 | Walker et al. |
| 2011/0093665 A1 | 4/2011 | Walker et al. |
| 2012/0016950 A1 | 1/2012 | Messick et al. |
| 2015/0170729 A1 | 6/2015 | Schaefer et al. |

CONTROL OF PAGE ACCESS IN MEMORY

CROSS-REFERENCE TO RELATED APPLICATION

This application is a continuation of and claims priority to U.S. patent application Ser. No. 14/286,104, which was filed on May 23, 2014, now U.S. Pat. No. 9,176,904, which issued on Nov. 3, 2015, which is a continuation of and claims priority to U.S. patent application Ser. No. 13/750,560, which was filed on Jan. 25, 2013, now U.S. Pat. No. 8,738,837, which issued on May 27, 2014, which is a divisional of and claims priority to U.S. application Ser. No. 12/478,532, which was filed on Jun. 4, 2009, now U.S. Pat. No. 8,380,916, which was issued on Feb. 19, 2013.

BACKGROUND

Field of Invention

Embodiments of the invention relate generally to memory systems, and more particularly, to access of memory.

Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more memory components, which may be accessed by various other components, such as other devices or applications in the electronic system. A memory component may be, for example, any data structure including a sequence or group of data elements. In some embodiments, a memory component may be a memory array, such as a dynamic random access memory (DRAM) array. A memory component may also be a bank or banks which make up a memory array. For example, a controller in the electronic system may access data in memory components, such as a memory array, to obtain data for processing. A "controller" may refer to any component, such as a processor, capable of substantially controlling access to the memory component. For example, the controller may open or close pages in the memory component, and may receive and grant requests from other components of the system to access the memory component. The controller may be a silicon-on chip (SOC), which may be external to a memory device or memory system containing a memory component. Further, in some embodiments, the controller may also be an internal processor embedded on or packaged with the memory device containing the memory component. Further, other components of the electronic system may also store data in the memory components.

Generally, more than one component of the electronic system may request access to a memory component, which may have multiple banks, each further including a number of pages. As used herein, a "page" refers to a row, or any other sequence or group of data elements organized in a memory. However, in a typical memory component, each bank may have only one page open at a time. For example, while a first component in the system may have access to a row in a bank, a second component may have to wait for the system to close the open row before a row requested by the second component is opened. Thus, the number of transactions between system components and the memory components may be limited by the access patterns of all the components requesting access to the memory.

In some systems, rows are configured to be left open once they are requested, and a component targeting the open row would not have to wait for the row to be opened. This "open page policy" may be advantageous for systems where requests for certain rows in a memory component are relatively predictable (e.g., a frequently requested row). In other systems, rows may be configured to close once a transaction is completed. This "closed page policy" may be implemented in systems where page access patterns are more random. However, the open page policy may require more power to operate, and the closed page policy may require more time to process each access request. Furthermore, in typical electronic systems, once a system is configured to have an open page policy or a closed page policy, the policy is set. The limitations of opening only one page at a time, and the set policy on page access in a memory bank may limit the efficiency of transactions in an electronic system

BRIEF DESCRIPTION OF DRAWINGS

Certain embodiments are described in the following detailed description and in reference to the drawings in which.

DETAILED DESCRIPTION

Figure 1:
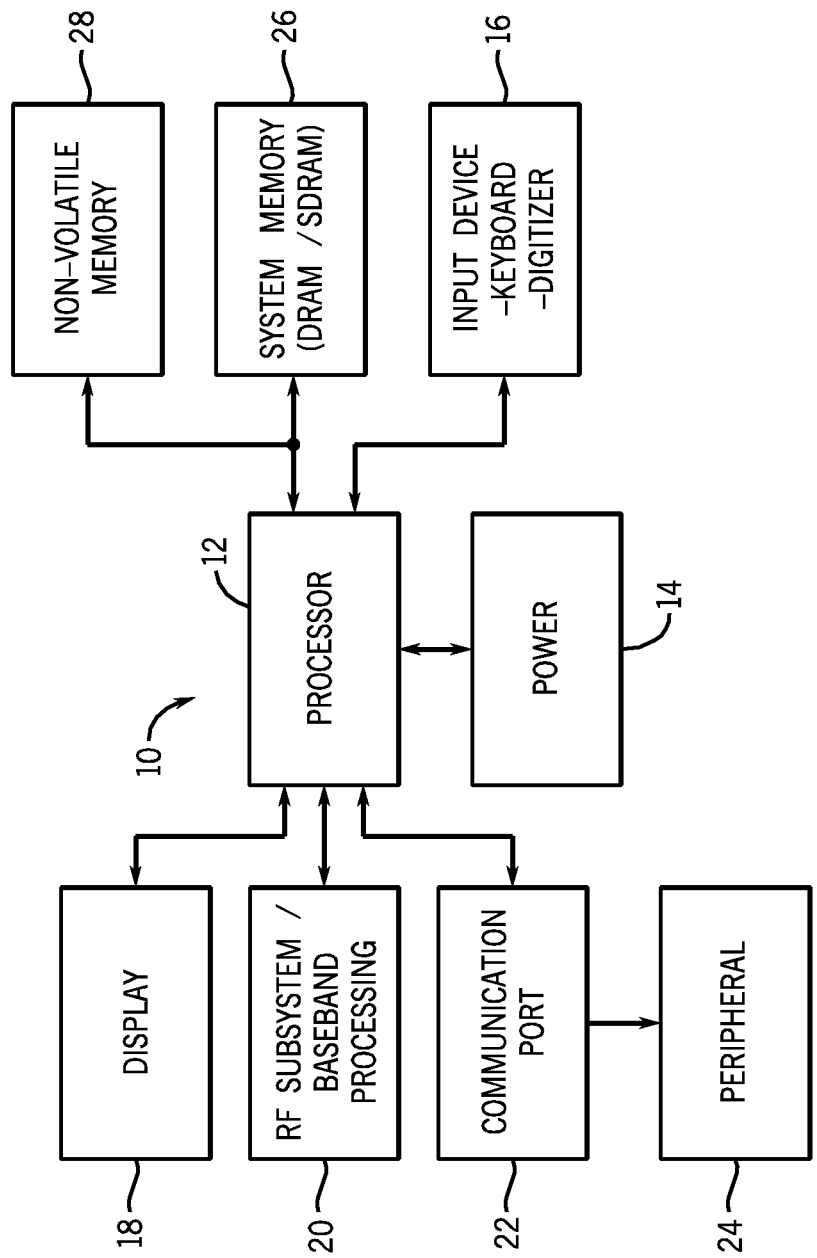
FIG. 1 depicts a block diagram of a processor-based system in accordance with an embodiment of the present technique.

In a typical electronic system, processing or operating speed may be partially limited by the access of memory by different components of the system. For example, more than one device may request access to different pages in a memory bank. As memory banks may typically have only one open page at a time, one or more devices may delay access to a requested page when the memory bank already has a different page open. Such delays may limit the number of transactions between components of the system and the memory, which may also limit the efficiency of the electronic system.

Some systems implement different methods of controlling access to pages in a memory component to address the limitations in accessing a memory component. For example, as discussed, some systems may implement an "open page policy" when accesses to a certain page in a bank are relatively predictable (e.g., a certain page is frequently accessed). For example, a graphics or video system may benefit from the open page policy. One disadvantage to this policy may be that more power is used in keeping the page constantly open. The "closed page policy" may conserve some power, and may be advantageous to systems where accesses to pages in the memory component are less predictable. For example, a modem may access a memory component which operates under a closed page policy, as the access patterns of a typical modem may be comparatively random. However, the closed page policy may cause unnecessary delays when a device requests access to a particular page more than once in immediate succession, as the page would still have to be closed by the controller each time one transaction is complete. Typically, once a system sets a memory bank for either the open page or closed page policies, access to that memory bank may always operate under the set policy. This limitation, in addition to the limitations resulting from opening only one page in a bank at one time, may reduce the efficiency of transactions between system components and the memory component.

One or more embodiments of the present techniques involve systems and methods of controlling access to more than one page in a memory bank at one time. A controller may substantially control access to more than one concurrently open page in the memory bank, and may organize access patterns to more efficiently process transactions between a master component (a component in the system requesting access to the memory component, hereinafter "master") and each memory bank. In one embodiment, the controller may prioritize a master and assign a page in the memory component to the prioritized master component. As more than one page may be open in the memory, additional requests from other masters may also be processed based on a number of factors including, for example, an order of received requests, a priority of the other masters, or some combination of factors. In another embodiment, the controller may assign different priorities to multiple masters. When a master requests access to a page, the page may be opened by the controller, and may remain open until a request from a higher priority master is received, or until the transaction times out. Some embodiments of the present techniques may assign a higher priority to masters requiring low latency, and may assign certain pages to such low latency masters.

Further, in some embodiments, methods of controlling page access may be dynamic, as a controller may change page access control methods based on a condition of the system (e.g., based on a change in the condition of the system). Page access control methods may also be a hybrid of other methods. For example, any memory bank may include different combinations of open pages, closed pages, or assigned pages, and page accesses may be based on a priority of masters, a chronological order of received requests, or any combination of the above.

Different components requesting access to the memory component may be referred to as a "master," and may request a transaction from the controller of the memory component. A "transaction" may refer to a write or a read to a page in the memory component, or any type of access to any part of the memory component.

Now turning to the figures, FIG. 1 depicts a processor-based system, generally designated by reference numeral 10. As is explained below, the system 10 may include various electronic components. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include memory devices manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other components may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by implementing software programs whose implementing instructions are stored in the memory. The software programs may include an operating system, database software, drafting software, word processing software, and/or video, photo, or sound editing software, for example. The memory is operably coupled to the processor 12 to store and facilitate execution of instructions to implement various programs. For instance, the processor 12 may be coupled to the system memory 26, which may include dynamic random access memory (DRAM), and/or synchronous dynamic random access memory (SDRAM). The system memory 26 may include volatile memory, non-volatile memory, or a combination thereof. The system memory 26 is typically large so that it can store dynamically loaded instructions and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store instructions for any necessary operating system or application programs, and fixed data. Additionally, the non-volatile memory 28 may include a high capacity memory such as a tape or disk drive memory, such as a hybrid-drive including resistive memory or other types of non-volatile solid-state memory, for instance.

The processor 12 may communicate with and/or control elements of the system memory 26. In some embodiments, the processor 12 may include a controller capable of controlling access to memory components in the system memory 26, in accordance with one or more of the present techniques. Though a processor 12 may include many different processor components capable of performing various tasks in the system 10, a processor capable of controlling access to memory components may also be referred to as a controller 12. Further, the system memory 26 may include memory components which may be controlled by the controller 12, including, for example, a memory array 30, illustrated in FIG. 2. The memory array 30 may have multiple banks 32 (as labeled by "Bank 0" to "Bank N"), and each bank 32 may have multiple pages 34 (as labeled by "Page 0" to "Page N"). In embodiments, more than one page 34a-34d may be open concurrently, such that a controller 12 may more efficiently allow transactions between different masters and different pages 34 in the same bank 32.

Figure 2:
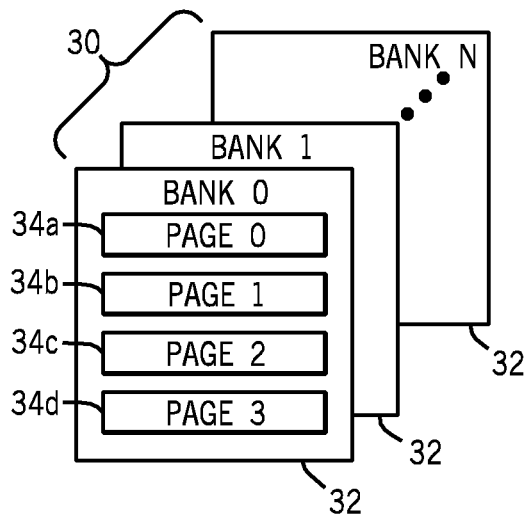
FIG. 2 illustrates a memory array having multiple banks with multiple pages, in accordance with an embodiment of the present technique.
Figure 3:
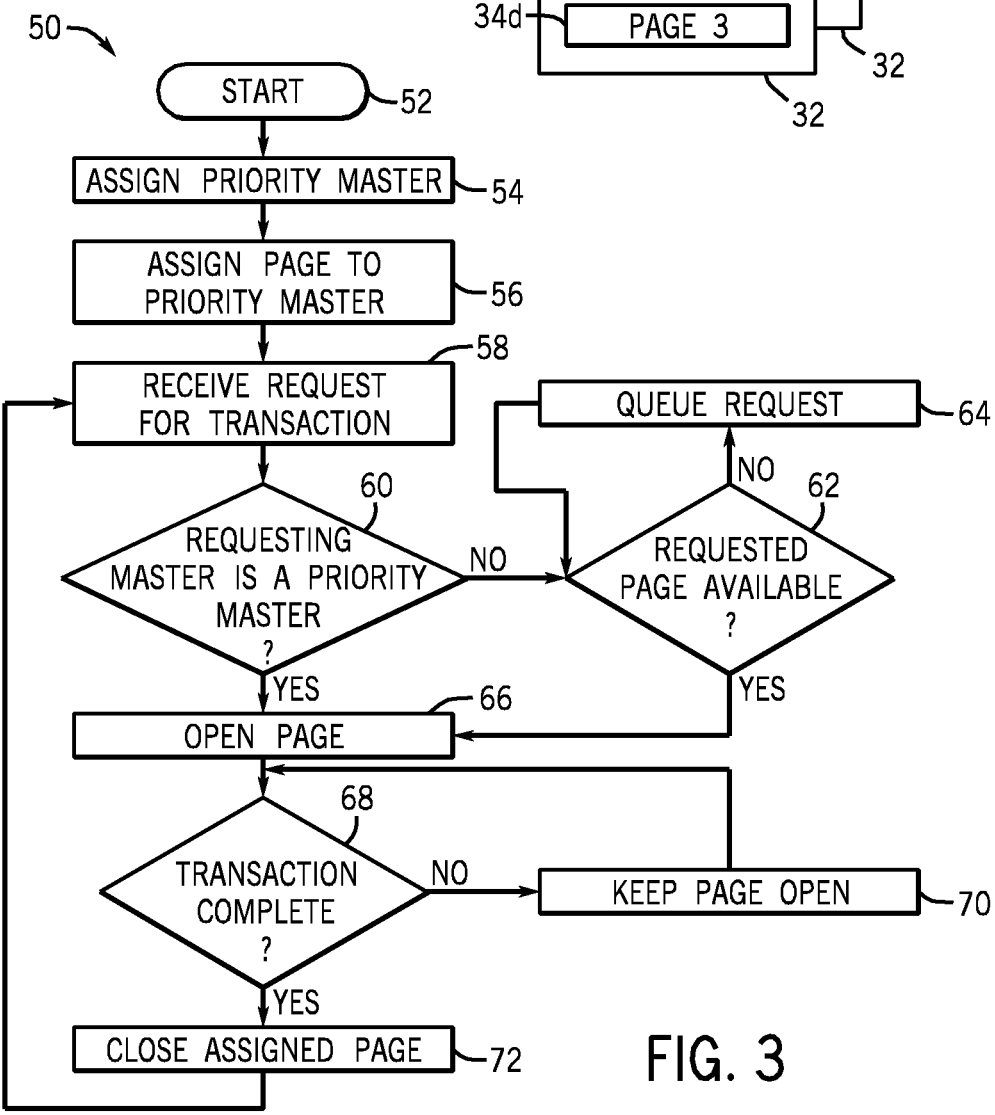
FIG. 3 depicts a flow chart illustrating a process for controlling a transaction between a master and an assigned page in the memory array, in accordance with one or more embodiments of the present technique.

One embodiment of the present techniques, controlling access to multiple open pages in a memory bank, is a page assignment process 50, depicted in the flow chart of FIG. 3. The process starts (block 52) when the controller 12 assigns a priority to a component which may request access to the memory array 30 (a "master") (FIG. 2) (block 54). The controller 12 may assign a priority to a master based on an application that is running in the system 10 (FIG. 1) or based on applications running or requests made by other components in the system 10. The controller 12 may then assign a page 34a to the priority master (block 56). For example, if the system 10 is initiating a graphics program, the controller 12 may assign a higher priority to the graphics master, and the assigned page 34a may be based on predicted access patterns (e.g., the controller may assign pages 34 that the graphics master is likely to access).

The controller may receive a request from a master for a transaction with a page 34a-34d (block 58). As the controller 12 has already assigned a priority master, and assigned page 34a to the priority master (block 54 and 56), the controller 12 may determine whether the master making the request is a priority master to which page 34a has been assigned (block 60). If the requesting master is not a priority master, the requesting master may still be able to access a page 34a-34d in the bank 32, as in one or more embodiments, more than one page 34 may be open concurrently. Pages 34 in the same bank 32 as the assigned page 34a may be available to the requesting master based on other factors, such as limitations on the number of open pages 34 per bank 32, or requests from other masters in the system 10. The controller 12 may determine whether the page requested by the requesting master is available, based on these factors (block 62). If the requested page is not available, the controller 12 may queue the request (block 64) until the controller 12 determines that the requested page is available (block 62). If the requested page is available, the controller 12 may open the page (block 66) even if the requesting master does not have priority, as more than one page 34 may be open concurrently in one bank 32.

If the controller 12 determines that the requesting master is the priority master, the controller 12 may open the assigned page 34a for the priority master (block 66). The assigned page 34a may operate on a closed page policy, meaning the page 34a may be closed once the transaction is complete. Thus, the controller 12 may determine whether the transaction is complete (block 68). If the transaction is still running (i.e., the priority master is still accessing the assigned page 34a), the assigned page 34a may remain open (block 70). If the controller 12 determines that the transaction has completed, the controller 12 may close the assigned page 34a (block 72). In one embodiment, the controller 12 may be configured to receive a request for a transaction (block 58) after closing the assigned page (block 72), or at any other point in the process 50.

Figure 4:
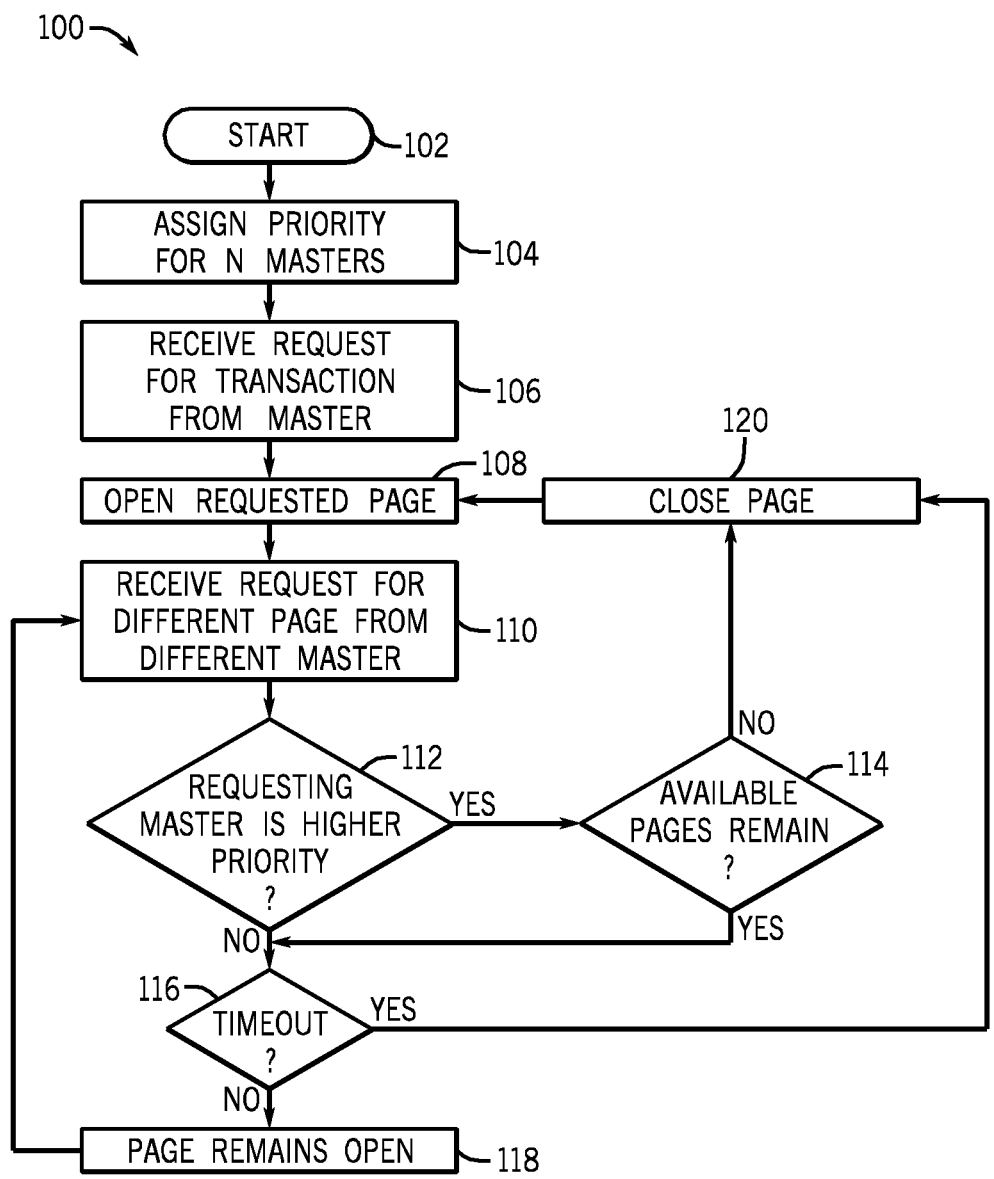
FIG. 4 depicts a flow chart illustrating a process for controlling a transaction between multiple masters and a requested page in the memory array, in accordance with one or more embodiments of the present technique.

Another embodiment of the present techniques, controlling access to more than one open page in a memory bank, may be depicted in the open page control process 100 of FIG. 4. The process 100 may start (block 102) when the controller 12 assigns priority for more than one (N) masters (block 104). For example, in applications where more than one device in a system 10 may randomly access different pages 34 in a memory array 30, the controller 12 may increase the number of transactions between masters and pages 34 in the memory array 30 by increasing the likelihood that a page 34a-34d will be available for a priority master. The controller 12 may receive a request for a transaction from a priority master (block 106), and open the requested page 34b (block 108). Thus, the priority master may access the opened page 34b even if another page 34a-34d in the bank 32 may also be open, as more than one page 34 may be open in the same bank 32. The controller 12 may receive a request for a different page 34c from a different priority master (block 110), and the controller 12 may also open the different requested page 34c. Though more than one page 34 may be open concurrently in the same bank 32, the process 100 illustrates an example of how a controller 12 may control the access of pages 34 when additional requests exceed a number of available pages 34 in a bank 32. In embodiments, not every request for a page 34 may result in an opening of the requested page 34, and the controller 12 may determine whether the requesting master has higher priority than the priority master which is accessing the opened page 34b (block 112). If the controller 12 determines that the new requesting master has a higher priority, the controller may then determine whether available pages remain in the memory bank 32, or whether another page 34c may be concurrently open with other open pages 34 in the bank 32 (block 114). For example, a bank 32 may have eight pages 34 (though only four are illustrated in FIG. 2), the bank 32 may be limited to have only four pages 34 open concurrently. If the limit has been reached, the controller may close the opened page 34b (block 120) and open the page 34c requested by the master with the higher priority (block 108).

If the controller determines that the master making the new request does not have higher priority (block 112), the controller 12 may determine if a timeout has occurred (block 116). A "timeout" may refer to situations where, for example, the priority master does not return results in some number of clock cycles, or some number of transactions. A timeout may also be based on the number of other requests from lower priority masters that enter the queue between the highest priority master transactions. In one or more embodiments, the process 100 may dynamically control access to pages in memory by altering access patterns based on a condition of the system 10. For example, although a controller 12 may determine that a requesting master has lower priority, the controller 12 may track the number of requests from lower priority masters, or track the number of lower priority masters in the queue. Even though a higher priority master may be accessing a page 34, timing out and closing the page 34 used by the higher priority master when a certain number of requests are made by lower priority masters may increase the utilization of the memory and the overall performance of the system 10. If the controller 12 determines that a timeout has occurred (block 116), the controller may close the opened page 34b (block 120) and open a different requested page (block 108) based on the requests of different priority masters. If the controller 12 determines that a timeout has not occurred (block 116), the controller 12 may keep the page 34b open (block 118). At any point in the process 100, the controller 12 may receive requests from different masters in the system 10.

In some embodiments, the priority of masters may be based on latency requirements of the masters. Low latency masters may refer to components in the system 10 making memory requests where speed of accessing memory is significant. It may be advantageous to reduce any latency in the memory access time for a low latency master. For example, and referring back to FIG. 2, one or more pages 34 in a memory bank 32 may be assigned to low latency masters. The pages 34 assigned to low latency masters may be accessed under a close page policy, such that once a low latency master requests a transaction and enters the queue, the controller 12 may determine that the low latency master has high priority, and may open the assigned page 34. In one embodiment, all low latency masters may use the same assigned page 34, or each low latency master may have a different assigned page. In some embodiments, hybrid control methods may be implemented, and the pages 34 in a bank 32 may be assigned or accessed through a combination of methods. For example, in a memory array 30 with four available pages 34 per bank 32, a master A may be a low latency master, and may be assigned to a page 34a. Masters B and C may also be low latency masters, and may share a page 34b. Two other pages 34c and 34d may be used for all other masters. In embodiments, the four available pages 34 may be open concurrently, and the opening and closing of the pages 34 may be controlled by the controller 12, and may be based on the access patterns of the masters in the system 10.

Furthermore, the present techniques may also be dynamic, and may include modifying a page access method depending on the operation of the system 10. The methods of controlling open pages in a memory component are not necessarily permanent, and may be dynamically altered to improve the efficiency of processing transactions between the masters and the memory component. For example, if the queue of pending transaction requests reaches a certain threshold, then the processing patterns of a current method (e.g., process 50 or process 100) may be modified to allow any master to use any available pages. The methods which assign a page to a priority master, or the methods which prioritize transaction requests based on the priority of the master may be temporarily changed to allow the controller 12 to process the pending transactions more efficiently. In some embodiments, once the queue length falls below a lower threshold, the controller 12 may return to an original method of controlling open pages.

Any of the systems and methods previously described of controlling open pages in a memory component may be combined. Additionally, throughout the operation of the system 10, any methods may be changed based on various conditions in the system 10. Methods of page access and changes in methods based on system conditions may be dynamic and/or hybrid, and may all be implemented to increase the efficiency of processing transactions between masters and memory components in the system 10.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A controller configured to control access to a memory bank in a memory array by:
   receiving a first request to access a first page in the memory bank from a first master component, wherein the memory bank comprises a plurality of pages;
   in response to the first request, opening the first page in the memory bank;
   receiving a second request for accessing a second page in the memory bank from a second master component; and
   in response to the second request, opening the second page such that the first page and the second page are concurrently open.

2. The controller of claim 1, wherein the controller is configured to:
   determine operating conditions of the memory bank, wherein the operating conditions comprise number of concurrently open pages in the memory bank, number of master components in queue to access the memory bank, or both; and
   dynamically adjust page access control method implemented to control access by the master components to the memory bank based on the operating conditions.

3. The controller of claim 1, wherein the controller is configured to control access to the memory bank by:
   receiving a third request for accessing a third page in the memory bank from a third master component; and
   in response to the third request, opening the third page.

4. The controller of claim 3, wherein the controller is configured to:
   determine whether number of concurrently open pages in the memory bank is equal to a limit on number of concurrently open pages; and
   close the second page before opening the third page when the number of concurrently open pages is equal to the limit on number of concurrently open pages.

5. The controller of claim 3, wherein the controller is configured to:
   determine operating duration of a transaction between the second master component and the second page;
   close the second page before opening the third page when the operating duration is greater than a specific number of clock cycles.

6. The controller of claim 1, wherein the controller is configured to:
   control access to the first page using a closed page policy; and
   control access to the second page using an open page policy.

7. A system, comprising:
   a controller configured to control access to a memory bank in a memory array, wherein:
   the memory bank comprises a plurality of pages; and
   the controller is configured to enable opening more than one of the plurality of pages concurrently in the memory bank.

8. The system of claim 7, wherein the controller is configured to dynamically adjust page access control method implemented to control access to the memory bank based on operating conditions of the memory bank.

9. The system of claim 7, wherein the controller is configured to:
   receive requests from master components to access the plurality of pages; and
   provide the master components access based at least in part on the requests.

10. The system of claim 7, wherein the controller is configured to control when each of the plurality of pages is opened or closed.

11. The system of claim 7, wherein the system comprises a computer, a pager, a cellular phone, a personal organizer, or a control circuit.

12. A controller configured to control access to a memory bank in a memory array, wherein the controller is configured to:
- determine operating conditions of the memory bank, wherein the memory bank comprises a plurality of pages;
- control access of master components to the memory bank using a first page access control method when the operating conditions comprise first operating conditions; and
- control access of the master components to the memory bank using a second page access control method when the operating conditions comprise second operating conditions, wherein the second operating conditions are different from the first operating conditions.

13. The controller of claim 12, wherein the controller is configured to enable opening more than one page in the memory bank concurrently when implementing the first page access control method, the second page access control method, or both.

14. The controller of claim 12, wherein the operating conditions comprise number of concurrently open pages in the memory bank, number of the master components in queue to access the memory bank, or both.

15. The controller of claim 14, wherein the controller is configured to:
- implement the first page access control method when the number of master components in the queue is less than a threshold; and
- implement the second page access control method when the number of master components in the queue is equal to the threshold.

16. The controller of claim 12, wherein the controller is configured to:
- provide the master components access to the memory bank based at least in part on priority assigned to one or more of the master components when implementing the first page access control method; and
- provide the master component access to the memory bank based at least in part on chronological order the controller receives requests from one or more of the master components when implementing the second page access control method.

17. The controller of claim 12, wherein the controller is configured to:
- close one of the plurality of pages upon completion of a transaction between one of the master components and the one of the plurality of pages when implementing the first page access control method; and
- maintain the one of the plurality of pages open until a timeout of the transaction between the one of the master components and the one of the plurality of pages occurs when implementing the second page access control method.

18. The controller of claim 12, wherein the controller is configured to:
- control access to the memory bank using a closed page policy when implementing the first page access control method; and
- control access to the memory bank using an open page policy when implementing the second page access control method.

19. The controller of claim 12, wherein the controller is configured to dynamically switch between the first page access control method and the second page access control method based at least in part on the operating conditions.

* * * * *